(12) United States Patent
Steed

(10) Patent No.: US 8,468,317 B2
(45) Date of Patent: Jun. 18, 2013

(54) APPARATUS AND METHOD FOR IMPROVED DATA RESTORE IN A MEMORY SYSTEM

(75) Inventor: Torry J Steed, San Diego, CA (US)

(73) Assignee: Agiga Tech Inc., San Diego, CA (US)

( * ) Notice: Subject to any disclaimer, the term of this patent is extended or adjusted under 35 U.S.C. 154(b) by 77 days.

(21) Appl. No.: 13/154,671

(22) Filed: Jun. 7, 2011

(65) Prior Publication Data

US 2012/0317382 A1  Dec. 13, 2012

(51) Int. Cl.
*G06F 12/00* (2006.01)
*G06F 12/16* (2006.01)

(52) U.S. Cl.
USPC ........... 711/162; 711/103; 711/104; 711/113; 711/E12.008; 711/E12.103

(58) Field of Classification Search
None
See application file for complete search history.

(56) References Cited

U.S. PATENT DOCUMENTS

| | | | |
|---|---|---|---|
| 3,916,390 A | 10/1975 | Chang et al. | |
| 5,799,200 A | 8/1998 | Brant et al. | |
| 6,295,577 B1 | 9/2001 | Anderson et al. | |
| 6,336,174 B1 | 1/2002 | Li et al. | |
| 8,074,112 B1 * | 12/2011 | Chang et al. | 714/14 |
| 2001/0055234 A1 | 12/2001 | Mori | |
| 2002/0191471 A1 | 12/2002 | Caulkins | |
| 2003/0095463 A1 | 5/2003 | Shimada et al. | |
| 2004/0030852 A1 | 2/2004 | Coombs et al. | |
| 2004/0103238 A1 | 5/2004 | Avraham et al. | |
| 2004/0158674 A1 | 8/2004 | Cloutier et al. | |
| 2005/0283648 A1 | 12/2005 | Ashmore | |
| 2006/0015683 A1 * | 1/2006 | Ashmore et al. | 711/113 |
| 2006/0072369 A1 | 4/2006 | Madter et al. | |
| 2006/0198198 A1 | 9/2006 | Fujita et al. | |
| 2006/0212651 A1 | 9/2006 | Ashmore | |
| 2007/0033431 A1 | 2/2007 | Pecone et al. | |
| 2007/0033432 A1 | 2/2007 | Pecone et al. | |
| 2007/0033433 A1 | 2/2007 | Pecone et al. | |
| 2007/0136523 A1 | 6/2007 | Bonella et al. | |
| 2007/0276995 A1 | 11/2007 | Caulkins et al. | |
| 2008/0022058 A1 * | 1/2008 | Nadathur et al. | 711/162 |
| 2008/0046638 A1 | 2/2008 | Maheshwari et al. | |
| 2009/0235038 A1 * | 9/2009 | Sartore | 711/162 |
| 2011/0113208 A1 * | 5/2011 | Jouppi et al. | 711/162 |

* cited by examiner

*Primary Examiner* — Edward Dudek, Jr.
*Assistant Examiner* — Ralph A Verderamo, III
(74) *Attorney, Agent, or Firm* — FSP LLC

(57) ABSTRACT

A process of interacting with a memory module to restore data backed up from volatile memory to nonvolatile memory of the memory module involves a host system configuring the volatile memory of the module to interoperate with a host memory controller via a DIMM memory interface to the module; the host configuring a controller of the module to copy data from the nonvolatile memory to a peripheral I/O bus, the configuration of the controller of the module carried out via the peripheral I/O bus; a host I/O controller receiving the data copied to the peripheral I/O bus and communicating the received data to a host memory controller; and the host memory controller copying the received data to the volatile memory via the DIMM memory interface, thus completing a restore of the data from nonvolatile memory to the volatile memory.

6 Claims, 2 Drawing Sheets

APPARATUS AND METHOD FOR IMPROVED DATA RESTORE IN A MEMORY SYSTEM

BACKGROUND

A memory module may include volatile and nonvolatile memory elements. Upon a power failure, or upon a command from a host system that includes the memory module, data from the volatile memory may be backed up to the nonvolatile memory. The memory module may interface to the host system as a Dual Inline Memory Module (DIMM), even though it also includes nonvolatile memory.

Due to the intrinsic backup capability of such a memory module, the host system gains the speed and flexibility of volatile memory, with the data security of nonvolatile memory. Backed up data is restored by commanding a memory controller internal to the module to copy data from nonvolatile memory back to volatile memory. Restoring data in this fashion leads to conflicts between memory settings suitable for the host system and settings required by the memory module's internal controller.

BRIEF DESCRIPTION OF THE DRAWINGS

In the drawings, the same reference numbers and acronyms identify elements or acts with the same or similar functionality for ease of understanding and convenience. To easily identify the discussion of any particular element or act, the most significant digit or digits in a reference number refer to the figure number in which that element is first introduced.

DETAILED DESCRIPTION

Preliminaries

Figure 1:
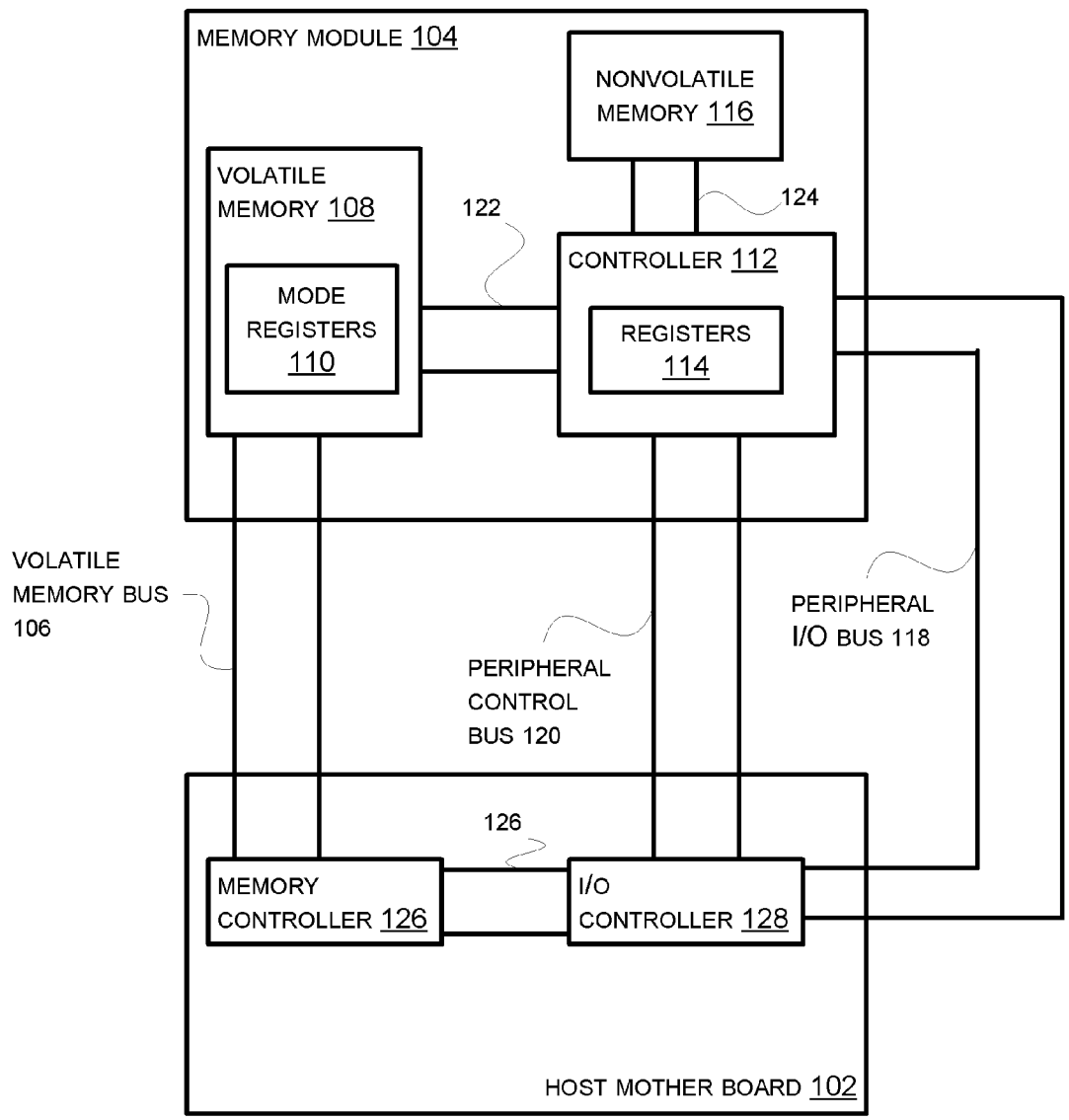
FIG. 1 is an illustration of an embodiment of a system for implementing a data restore operation.

References to "one embodiment" or "an embodiment" do not necessarily refer to the same embodiment, although they may. Unless the context clearly requires otherwise, throughout the description and the claims, the words "comprise," "comprising," and the like are to be construed in an inclusive sense as opposed to an exclusive or exhaustive sense; that is to say, in the sense of "including, but not limited to." Words using the singular or plural number also include the plural or singular number respectively, unless expressly limited to a single one or multiple ones. Additionally, the words "herein," "above," "below" and words of similar import, when used in this application, refer to this application as a whole and not to any particular portions of this application. When the claims use the word "or" in reference to a list of two or more items, that word covers all of the following interpretations of the word: any of the items in the list, all of the items in the list and any combination of the items in the list, unless expressly limited to one or the other.

"Logic" refers to machine memory circuits, machine readable media, and/or circuitry which by way of its material and/or material-energy configuration comprises control and/or procedural signals, and/or settings and values (such as resistance, impedance, capacitance, inductance, current/voltage ratings, etc.), that may be applied to influence the operation of a device. Magnetic media, electronic circuits, electrical and optical memory (both volatile and nonvolatile), and firmware are examples of logic.

Those skilled in the art will appreciate that logic may be distributed throughout one or more devices, and/or may be comprised of combinations memory, media, processing circuits and controllers, other circuits, and so on. Therefore, in the interest of clarity and correctness logic may not always be distinctly illustrated in drawings of devices and systems, although it is inherently present therein.

The techniques and procedures described herein may be implemented via logic distributed in one or more computing devices. The particular distribution and choice of logic is a design decision that will vary according to implementation.

Overview

A memory module is designed to interface with a host system as a Dual Inline Memory Module (DIMM). The memory module includes volatile memory and nonvolatile memory. A DIMM module interface is provided to the volatile memory, so that to a host system, the memory module interfaces and interacts as a fast, flexible volatile memory space, but with the additional feature that data may be backed up from volatile to nonvolatile memory in the event of a power failure or host system command. A peripheral I/O bus interface is provided to the nonvolatile memory. The peripheral I/O bus interface also interfaces to control logic of the memory module to initiate data backup from the volatile to the nonvolatile memory. The peripheral I/O bus may implement Universal Serial Bus communications, or other common peripheral I/O protocols such as SATA and PCI Express.

The memory module may include logic to cause an interface to the nonvolatile memory to be read/write for operations between the nonvolatile memory and the volatile memory, and to cause the interface to the nonvolatile memory to be read-only for operations between the nonvolatile memory and the peripheral bus. The module may also include logic to encrypt data copied from the volatile memory to the nonvolatile memory, and to copy encrypted data in the nonvolatile memory to the peripheral I/O bus without decrypting the copied data.

A process of interacting with a memory module to restore data backed up from volatile memory to nonvolatile memory of the memory module involves a host system configuring the volatile memory of the module to interoperate with a host memory controller via a DIMM memory interface to the module. The host configures a controller of the module to copy data from the nonvolatile memory to a peripheral I/O bus. The configuration of the controller of the module is carried out via the peripheral I/O bus. A host I/O controller receives the data copied to the peripheral I/O bus and communicates the received data to a host memory controller. The host memory controller copies the received data to the volatile memory via the DIMM memory interface, thus completing a restore of the data from nonvolatile memory to the volatile memory.

Detailed Description

FIG. 1 is an illustration of an embodiment of a system for implementing a data restore operation. The system includes a host 102 (e.g., a host motherboard) that utilizes the data storage capabilities of a memory module 104. The host 102 includes an I/O bus controller 128 and a volatile memory bus controller 126 that communicate via a bus 106. The memory module 104 includes both volatile 108 and nonvolatile 116 memory logic. The volatile memory 108 includes mode configuration registers 110. The memory module 104 also includes controller logic 112. The controller 112 includes configuration registers 114.

The memory module 104 may interface to the host system 102 as a Dual Inline Memory Module (DIMM), even though it also includes nonvolatile memory 116. Upon a power failure, or upon a command from a host system 102, data from the volatile memory 108 may be backed up from the volatile memory 108 to the nonvolatile memory 116 through controller 112, via busses 122 and 124, which are internal to the memory module 104.

Figure 2:
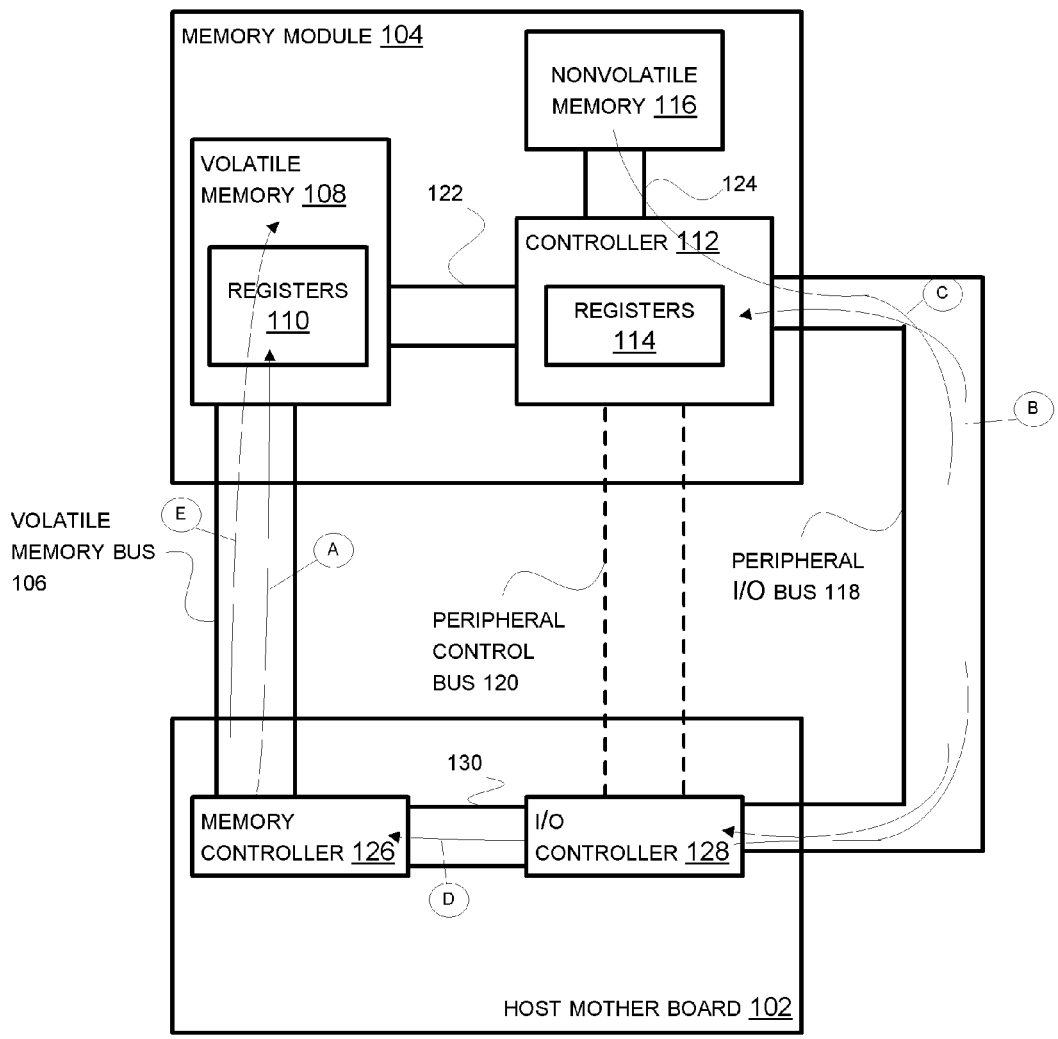
FIG. 2 is an illustration of an embodiment of a process of restoring data backed up from volatile to nonvolatile memory.

Data that has been backed up from volatile memory 108 to the nonvolatile memory 116 may be restored to the volatile memory 108 using a process such as that depicted in FIG. 2. The process is illustrated as an exemplary sequence of events. Variations of this exemplary sequence are described thereafter.

The volatile memory 108 can operate in different modes when interacting with the memory module controller 112 or the host memory controller 126. Action "A" involves the host configuring the volatile memory 108 for compatible operation with the host memory controller 126. Action "B" involves the host 102 operating the I/O controller 128 to configure the memory module controller 112 to copy data from the nonvolatile memory 116, not to the volatile memory 108 as in a conventional restore operation, but instead to the peripheral I/O bus 118. Configuration of the memory module controller 112 is performed via the peripheral I/O bus 118, as opposed to conventional systems in which the memory module controller 112 is configured via the peripheral control bus 120 (e.g., via I²C). The host 102 may also use the peripheral I/O bus 118 to configure the controller 112 to control (e.g., initiate, terminate) data backups between the volatile memory 108 and the nonvolatile memory 116.

Thus, a memory module 104 capable of use in the restore operation described herein includes controller logic 112 that may be adapted via registers 114 or other writable memory technology to communicate data stored in a nonvolatile memory 116 to a peripheral I/O bus 118. Such a memory module 104 also includes a peripheral I/O bus interface. The peripheral I/O bus 118 may operate according to various known I/O communications technologies, such as Universal Serial Bus (USB), PCI Express, and Serial Advanced Technology Attachment (SATA). The memory module 104 thus emulates a DIMM module (i.e., interfaces to and interoperates with the host as a DIMM module), provides internal busses 122 and 124 to communicate data to and from the volatile memory 108 and nonvolatile memory 116, and yet also includes a peripheral I/O interface to the nonvolatile memory 116. The memory module 104 may also be adapted such that the controller 112 may be configured by way of the peripheral I/O bus 118, with logic to interface with a separate peripheral control bus 120 either not present in the memory module 104, or present but unutilized (hence, the bus 120 is illustrated with a dotted line).

Action "C" involves the memory module controller 112 communicating data from the nonvolatile memory 116 to the I/O controller 128 of the host system. Action "D" involves the I/O controller communicating the data received from the memory module controller 112 to the host system memory controller 126 via internal host bus 130. Action "E" involves the host memory controller 126 communicating the data received from the host I/O controller 128 to the volatile memory 108 via volatile memory bus 106, i.e. via a conventional DIMM interface. The mode registers 110 of the volatile memory 108 are not disturbed by controller 112, and therefore do not need to be re-written by the host following a restore operation.

In one implementation, the bus interface 124 between the nonvolatile memory 116 and the memory module controller 112 is operated as a read/write interface when communicating with the volatile memory 108, and as a read-only interface when communicating with the peripheral I/O bus 118. The peripheral I/O bus 118 may however be used to both write registers (or otherwise configure) the memory module controller 112, and also to read the configuration status of the controller 112. If the configuration status indicates that the data stored in the nonvolatile memory 116 is invalid or corrupted, the nonvolatile memory 116 may be made unavailable for reading via the peripheral I/O bus 118.

The system and data restore process may be employed to implement a rotating disk write cache. Periodically, an optical or magnetic disk controller (which could be the same as the peripheral I/O controller 118) copies data from the volatile memory 108 to the disk. If a power failure occurs between data copies to the disk, the memory module controller 112 copies the data from volatile memory 108 to nonvolatile memory 116. When power is restored, the host 102 copies the backed up data from the nonvolatile memory 116 via the peripheral I/O bus 118. The copied data is either written to the disk, or else copied back into volatile memory 108 from which it is then written to the disk via the write cache process. In this manner, no data loss occurs due to the power failure.

In a conventional system employing encryption, data backed up from volatile memory 108 to nonvolatile memory 116 via memory module controller 112 is encrypted by the controller 112, and then decrypted by the controller 112 when the data is restored from nonvolatile memory 116 to volatile memory 108. In the present system, data is also encrypted during a backup from volatile memory 108 to nonvolatile memory 116 via memory module controller 112. However, data decryption during the restore process is not carried out by the memory module controller 112. Instead, the encrypted data from the nonvolatile memory 116 is copied directly to the peripheral I/O bus 118 to the host 102, where the decryption logic is located (including decryption keys) and where decryption takes place. This helps prevent unauthorized snooping on the contents of volatile memory 108 as saved in nonvolatile memory 116 by observing the data traffic over peripheral IO bus 118.

Implementations and Alternatives

Those having skill in the art will appreciate that there are various logic implementations by which processes and/or systems described herein can be effected (e.g., hardware, software, and/or firmware), and that the preferred vehicle will vary with the context in which the processes are deployed. "Software" refers to logic that may be readily readapted to different purposes (e.g. read/write volatile or nonvolatile memory or media). "Firmware" refers to logic embodied as read-only memories and/or media. Hardware refers to logic embodied as analog and/or digital circuits. If an implementer determines that speed and accuracy are paramount, the implementer may opt for a hardware and/or firmware vehicle; alternatively, if flexibility is paramount, the implementer may opt for a solely software implementation; or, yet again alternatively, the implementer may opt for some combination of hardware, software, and/or firmware. Hence, there are several possible vehicles by which the processes described herein may be effected, none of which is inherently superior to the other in that any vehicle to be utilized is a choice dependent upon the context in which the vehicle will be deployed and the specific concerns (e.g., speed, flexibility, or predictability) of the implementer, any of which may vary. Those skilled in the art will recognize that optical aspects of implementations may involve optically-oriented hardware, software, and or firmware.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood as notorious by those within the art that each function and/or operation within such block diagrams, flowcharts, or examples can be implemented, individually and/or collectively, by a wide range of hardware, software, firmware, or virtually any combination thereof. Several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, can be equivalently implemented in standard integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and/or firmware would be well within the skill of one of skill in the art in light of this disclosure. In addition, those skilled in the art will appreciate that the mechanisms of the subject matter described herein are capable of being distributed as a program product in a variety of forms, and that an illustrative embodiment of the subject matter described herein applies equally regardless of the particular type of signal bearing media used to actually carry out the distribution. Examples of a signal bearing media include, but are not limited to, the following: recordable type media such as floppy disks, hard disk drives, CD ROMs, digital tape, and computer memory.

In a general sense, those skilled in the art will recognize that the various aspects described herein which can be implemented, individually and/or collectively, by a wide range of hardware, software, firmware, or any combination thereof can be viewed as being composed of various types of "circuitry." Consequently, as used herein "circuitry" includes, but is not limited to, electrical circuitry having at least one discrete electrical circuit, electrical circuitry having at least one integrated circuit, electrical circuitry having at least one application specific integrated circuit, circuitry forming a general purpose computing device configured by a computer program (e.g., a general purpose computer configured by a computer program which at least partially carries out processes and/or devices described herein, or a microprocessor configured by a computer program which at least partially carries out processes and/or devices described herein), circuitry forming a memory device (e.g., forms of random access memory), and/or circuitry forming a communications device (e.g., a modem, communications switch, or optical-electrical equipment).

Those skilled in the art will recognize that it is common within the art to describe devices and/or processes in the fashion set forth herein, and thereafter use standard engineering practices to integrate such described devices and/or processes into larger systems. That is, at least a portion of the devices and/or processes described herein can be integrated into a network processing system via a reasonable amount of experimentation.

The foregoing described aspects depict different components contained within, or connected with, different other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled", to each other to achieve the desired functionality.

What is claimed is:

1. A memory module that interfaces with a host system as a Dual Inline Memory Module (DIMM), comprising:
   a volatile memory and a nonvolatile memory;
   a DIMM module interface to the volatile memory;
   a peripheral I/O bus interface to the nonvolatile memory, the peripheral I/O bus interface also interfacing to control logic of the memory module to initiate data backup from the volatile to the nonvolatile memory; and
   logic to cause an interface to the nonvolatile memory to be read/write for operations between the nonvolatile memory and the volatile memory, and to cause the interface to the nonvolatile memory to be read-only for operations between the nonvolatile memory and the peripheral bus.

2. The memory module of claim 1, further comprising:
   the peripheral I/O bus implements one of Universal Serial Bus, PCI Express, or SATA communications.

3. The memory module of claim 1, further comprising:
   logic to encrypt data copied from the volatile memory to the nonvolatile memory, and to copy encrypted data in the nonvolatile memory to the peripheral I/O bus without decrypting the copied data.

4. A process of interacting with a memory module to restore data backed up from volatile memory to nonvolatile memory of the memory module, the process comprising:
   a host system configuring the volatile memory of the module to interoperate with a host memory controller via a DIMM memory interface to the module;
   the host configuring a controller of the module to copy data from the nonvolatile memory to a peripheral I/O bus, the configuration of the controller of the module carried out via the peripheral I/O bus;
   a host I/O controller receiving the data copied to the peripheral I/O bus and communicating the received data to a host memory controller; and
   the host memory controller copying the received data to the volatile memory via the DIMM memory interface, thus completing a restore of the data from nonvolatile memory to the volatile memory.

5. The process of claim 4, further comprising:
   backing up data from the volatile memory to the nonvolatile memory, and the controller of the module encrypting the data as it is backed up;
   copying the encrypted data to the peripheral I/O bus; and
   the host receiving the encrypted data via the peripheral I/O bus and decrypting the encrypted data.

6. The process of claim 4, further comprising:
   copying the data from the volatile memory to a magnetic or optical disk.

* * * * *